(12) United States Patent
Macaulay

(10) Patent No.: US 6,651,045 B1
(45) Date of Patent: Nov. 18, 2003

(54) INTELLIGENT HUMAN/COMPUTER INTERFACE SYSTEM

(75) Inventor: Archibald Macaulay, New Malden (GB)

(73) Assignee: Bae Systems (Land and Sea Systems) Limited, Farnborough (GB)

( * ) Notice: Subject to any disclaimer, the term of this patent is extended or adjusted under 35 U.S.C. 154(b) by 0 days.

(21) Appl. No.: 09/453,688

(22) Filed: Dec. 3, 1999

Related U.S. Application Data

(63) Continuation of application No. PCT/GB99/00112, filed on Jan. 13, 1999.

(30) Foreign Application Priority Data

Jan. 13, 1998 (GB) .............................................. 9800590

(51) Int. Cl.$^7$ ................................................ G06N 5/00
(52) U.S. Cl. ......................................... 706/11; 706/45
(58) Field of Search ..................... 706/11, 45

(56) References Cited

U.S. PATENT DOCUMENTS

| | | | | |
|---|---|---|---|---|
| 4,383,135 A | * | 5/1983 | Scott et al. ................... | 704/236 |
| 5,199,062 A | * | 3/1993 | Von Meister et al. .... | 379/88.04 |
| 5,282,265 A | | 1/1994 | Rohra Suda et al. | |
| 5,588,037 A | * | 12/1996 | Fuller et al. ........... | 379/211.02 |
| 5,652,789 A | * | 7/1997 | Miner et al. ........... | 379/201.01 |
| 5,673,299 A | * | 9/1997 | Fuller et al. ........... | 379/210.03 |
| 5,822,727 A | * | 10/1998 | Garberg et al. .......... | 704/270.1 |
| 5,838,779 A | * | 11/1998 | Fuller et al. ........... | 379/211.02 |
| 5,924,016 A | * | 7/1999 | Fuller et al. ........... | 379/202.01 |
| 6,021,403 A | * | 2/2000 | Horvitz et al. ................. | 706/45 |

FOREIGN PATENT DOCUMENTS

| | | |
|---|---|---|
| EP | 0 543 329 A2 | 5/1993 |
| EP | 0 860 784 | 8/1998 |
| JP | 4-332084 | 11/1992 |
| JP | 7-93353 | 4/1995 |

OTHER PUBLICATIONS

Agah, A.; Tanie, K., Human–machine interaction through an intelligent user interface based on contention architecture, Robot and Human Communication, 1996., 5th IEEE International Workshop on , 1996 , pp.: 537–542, Jan. 1996.*

Vale, Z.A.; Faria, L.; Ramos, C.; Fernandez, M.F.; Marques, A., Towards more intelligent and adaptive user interfaces for control center applications, Intelligent Systems Applications to Power Systems, 1996. Proceedings, ISAP '96., International Conferenc, Jan. 1996.*

Malin, J.T.; Schreckenghost, D.L., User as intelligent agent: Interface design for intelligent monitoring systems, Artificial Intelligence for Applications, 1993. Proceedings., Ninth Conference on , 1993 , pp.: 461, Jan. 1996.*

Jozuka et al, "Technique of Supporting Conversation for Offering an Environment for Rich Communication" *NTT Technical Journal*, Apr. 1, 1998, vol. 10, No. 4, pp. 58–61.

Mellor et al, "Evaluating Automatic Speech Recognition as a Component . . . " pp. 1668–1671; XP–002084815.

* cited by examiner

*Primary Examiner*—Wilbert L. Starks, Jr.
(74) *Attorney, Agent, or Firm*—Nixon & Vanderhye P.C.

(57) ABSTRACT

A human computer interface system capable of providing real time context intelligence in relation to automatically recognized input signals. The system provides for the real time monitoring of operator and/or user inputs providing intelligent support by way of text, electronically presented data, information and speech outputs.

20 Claims, 1 Drawing Sheet

INTELLIGENT HUMAN/COMPUTER INTERFACE SYSTEM

This is a continuation of PCT/GB99/0012, filed Jan. 13, 1999.

BACKGROUND OF THE INVENTION

1. Field of the Invention

This is invention relates to the field of human computer interfacing and more particularly but not exclusively to intelligent systems and their ability to process botch voice and data inputs.

2. Discussion of Prior Art

State of the art applications and database interrogation methods usually comprise the use of trained operators utilizing menu driven interface systems to retrieve the required data or information on demand. Such systems typically require the operator to have knowledge of the access requirements of a number of databases and in most cases further constrains the operator to using and having access to only one such database at a time.

In areas such as Telephone Call Centres, typically used by companies for customer query and complaint processing, trained operators are required to ask predetermined questions of the callers to enable them to then manually access whichever particular database is required, in order to identify such features as part numbers, makes and/or models for use in processing the query or complaint. For example, a typical call center operator may be required to respond to customer requests for information over a range of differing company products, namely telephones, washing machines, televisions, audio equipment etc. The operator would therefore have to quickly establish which particular type of product the caller is referring to following by the make, model number, serial number and possibly date of purchase, these types of information most probably being stored on more than one database. The requirement to switch between a range of databases using a keyboard and/or mouse and conduct a conversation using a predetermined set of closely worded questions can be an arduous task for a call center operator and our invention would significantly reduce the operator work load and call time per transaction.

Numerous other applications where access to a range of databases is required which currently use manual operator access may include logistics and support, physical security and tasks such as those performed by ships' captains when steering vessels, pilots and airborne engineers.

European Patent Application No. 92119615.0 discloses a speech dialogue system for facilitating human-computer interaction. This speech dialogue based invention, although having a human-computer interaction role, does not perform the function of assisting a human operator in his or her tasks but is designed to replace a human operator. The invention allows a human to speak to a machine, and through a speech recognition system a response to input speech is formulated and an output made according to the understood semantic content of the input speech. The understanding of a semantic content of an input speech from the user is made by detecting keywords in the input speed with the keywords in the input speed being limited in advance in accordance with the needs of the overall system.

SUMMARY OF THE INVENTION

The speech dialogue system therefore assists a customer by replacing a human operator and not by supporting an operator throughout a series of transactions. Our invention utilizes a human computer interface system and an intelligence system which enables real time analysis of operator and/or customer inputs (keyboard, mouse, speech etc.) and provides a reasoning facility designed specifically to support an operator by navigating a "rich" data domain (one or more databases) in response to contextual keywords and phrases provided by a automatic speech recognition system.

Our invention provides apparatus and a method of providing real-time context intelligence of automatically recognized key words/phrases, for use in hands free searches of simple and more complex databases. Additionally it provides a flexible and powerful approach to improving current Call Centre Software support by integrating a fully functional Human Computer Interface (HCI)System with an Intelligent system and allowing these to be further integrated with an existing software Application.

Accordingly there is provided a human-computer interface system, comprising user interface and display means for both inputting speech and data and outputting visual and speech responses, human-computer interface means for recognition of a user input and subsequent passing of recognized inputs to an intelligence systems means, and for supplying output signals to the user interface and display means, intelligence system means for correlating the recognized user input with the context of the operation being performed by the user, based on an intelligent assessment of the context of the user operation, and based on such assessment, sending output signals to the user interface and display means which may comprise information or data retrieved from an applications or database.

According to another aspect of the invention there is provided a method a method of providing real time context intelligence in relation to automatically recognized input signals whereby information and/or data inputted from a user interface and display means is recognized by a human-computer interface means such that it can be passed to an intelligence system means whereby the recognized user input data and information is correlated with the context of the operation being performed by the user, and based on an intelligent assessment of the context of the user operation, output signals are sent back to the user interface and display means, said output signals capable of comprising information or data retrieved from applications or database.

BRIEF DESCRIPTION OF THE DRAWINGS

Other features and advantages of the invention will become apparent from the following description taken in conjunction with the accompanying drawings.

The invention is illustrated in FIGS. 1 to 3 by way of example only in which.

DETAILED DISCUSSION OF PREFERRED EMBODIMENTS

Figure 1:
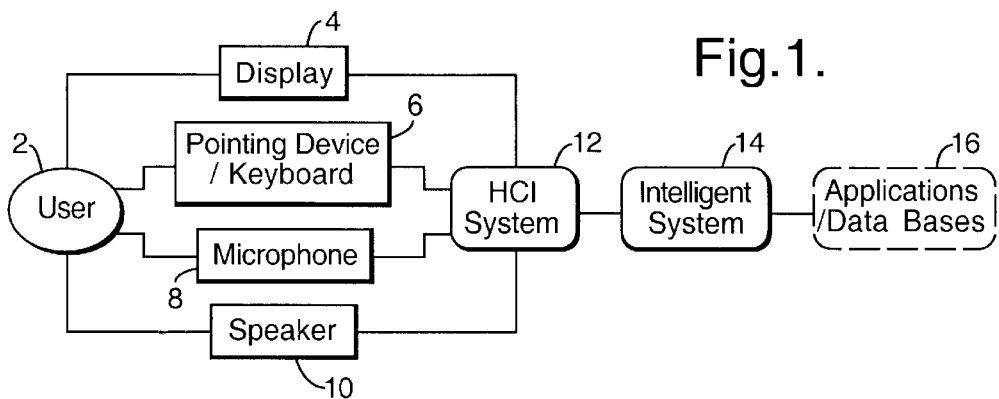
FIG. 1 shows a diagrammatic representation of a typical system in accordance with the invention.

In FIG. 1, a user or operator 2 is depicted as having a range of interface devices at his or her disposal, namely a display 4 for the pointing device/keyboard 6, a microphone 8 and a speaker 10. All of the above devices (namely 4, 6, 8, 10) are connected to a human computer interface system (HCI) 12 which in turn is linked to an intelligence system 14 which has access to a range of applications and/or databases 16. Whilst in use, the overall system as depicted in FIG. 1 enables the user or operator 2 to use any of the available input devices, (i.e. pointing device/keyboard 6 and microphone 8) to access applications and/or databases 16 through the HCI system 12 and the intelligence system 14. The function of the HCI system 12 and intelligence system 14 is essentially to "eavesdrop" on a conversation or data exchange between the user or operator 2 and either another person or persons (not shown) or another data outputting system (not shown).

Figure 2:
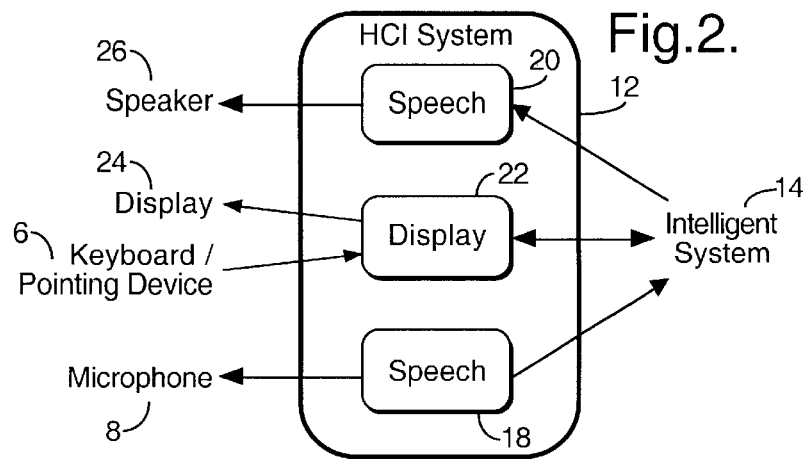
FIG. 2 shows a diagrammatic representation of an HCI System.

The HCI System as shown at FIG. 2 consists of integrated voice recognition 18, speech synthesis 20 and display functions 22. This allows the recognized voice phrases to amend the displayed information 24 (e.g. presenting a help window) as well as being forwarded to the Intelligent System 14 to allow it to monitor and if required change the context under which it is operating. Standard interactions via the pointing device and or the keyboard 6 are also forwarded to the Intelligent System for inclusion in the overall decision making, intelligent process.

The messages from the Intelligent System 14 can trigger display changes 24 (e.g. presenting the next set of prompt questions) and can also trigger speech synthesis 26 (e.g. a telephone number could be relayed). In some cases the message from the Intelligent System 14 can trigger both display changes 24 and speech synthesis 26.

Figure 3:
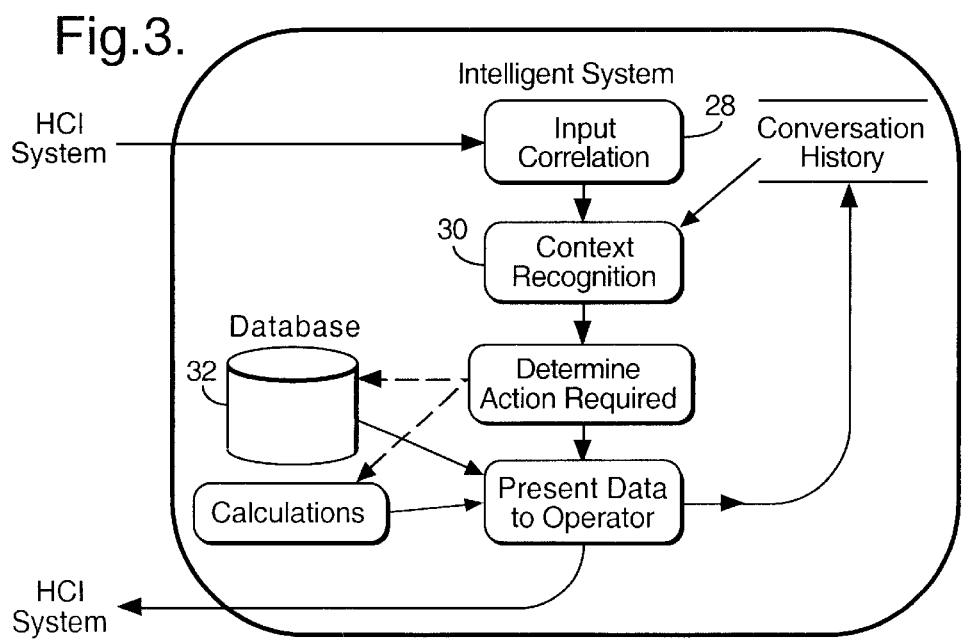
FIG. 3 shows a diagrammatic representation of an Intelligent System in accordance with the invention.

FIG. 3 shows the activities that are carried out by the Intelligent System 14 as shown in FIGS. 1 and 2. Firstly, the Intelligent system 14 correlates the input data in the Input Correlation module from the user/operator's 2 display 4 and microphone input 8 to identify the subject matter of the user/operator's 2 input. Following this, the current state in the conversation/interaction is used to determine the context of the operator's input in the context recognition module 30. Once the subject has been identified and the context is known, the actions that are required to derive the data that is of use to the operator are determined. This may involve querying one or more databases 32, performing calculations, analyzing trades, looking up case histories, etc. Once the actions have been completed and the data has been obtained, it is then presented to the operator in a suitable manner, either textually by for example a printer (not shown) graphically, via a form of display 4, sonically via a speaker 8, or some combination of all of these. Additionally, the current status of the conversation/interaction needs to be updated in order to provide the proper context for further operator inputs. The intelligent System therefore continually monitors all of the inputs made through the HCI such that when the input correlation 28 and content recognition modules 30 detect a change in user/operator 2 requirements, then the system can respond by accessing the newly required databases 32 and/or performing the necessary calculations.

Potential applications of the invention are numerous, and extend to any user/operator based system where access to, and navigation around a 'rich' data domain, i.e. one or more databases is required.

Examples of applications may include air traffic control operators, whereby the use of the invention would provide for the real time monitoring of incoming speech and data, the system responding to speech or data inputs in an intelligent manner by assessing the context of the current operators work and providing access to differing databases, display screens or other information when required but not necessarily with direct request.

Other examples may include use by pilots to manage onboard systems, weapon systems' operators, ships' captains and call centre operators.

What is claimed is:

1. A computer system for aiding a communication between at least one operator and at least one other person, said system comprising:

a communications monitor for monitoring said communication for the existence of specific voice phrases; and a data storage, responsive to the communications monitoring system identification of a specific voice phrase, for retrieving and presenting, to said operator, data relating to said specific voice phrase.

2. The system according to claim 1, wherein said communications monitor, upon finding the existence of a specific voice phrase, assigns a particular context to the communications and limits, to a context-related subset, the specific voice phrases to which the monitor is subsequently responsive.

3. The system according to claim 2, wherein said data storage retrieval is limited by the context assigned to the communication.

4. The system according to claim 1, including a computer display, accessible to said operator, for displaying said data relating to said specific voice phrase.

5. The system according to claim 1, wherein said monitor comprises:

a voice recognition system, responsive to said communication, recognizing any one of specific voice phrases.

6. The system according to claim 1, wherein said data storage comprises a plurality of data bases.

7. A computer system for aiding a communication between at least one operator and at least one other person, said operator having a computer display terminal and computer input device, said system comprising:

a communications monitor for monitoring said communication for the existence of specific input voice phrases and providing a characteristic output when a specific voice phrase is monitored; and a data storage, responsive to the communications monitoring system output, for retrieving and presenting, to said operator display terminal, data relating to said monitored specific voice phrase.

8. The system according to claim 7, wherein said monitor also monitors information provided by said operator with said computer input device for a specific input phrase, and provides a characteristic output when said specific input phrase is input by said operator.

9. The system according to claim 8, wherein said communications monitor, upon finding the existence of a specific voice phrase or specific input phrase, assigns a particular context to the communications and limits the subsequent voice phrases and input phrases, to which the monitor is responsive, to a context-related subset.

10. The system according to claim 8, wherein, responsive to said monitor finding the existence of one of a specific voice phrase or specific input phrase in said communication, said data storage provides related data to said operator display.

11. A method of aiding communications between at least one operator and at least one other person, said method comprising the steps of:

monitoring said communication for the existence of specific voice phrases; and in response to identification of a specific voice phrase, retrieving and presenting, to said operator, data relating to said specific voice phrase.

12. The method according to claim 11, wherein said monitoring step includes the step of, when said specific voice phrase is present, assigning a particular context to said communications.

13. The method according to claim 12, wherein said data retrieval is limited by the context assigned to the communication.

14. The method according to claim 11, wherein said presenting step includes presenting on a computer display, accessible to said operator, said data relating to said specific voice phrase.

15. The method according to claim 11, wherein said monitoring step includes a voice recognition step which, responsive to said communication, recognizes specific voice phrases.

16. The method according to claim 11, wherein said retrieving steps comprises retrieving data from a plurality of data bases.

17. A method of aiding a communication between at least one operator and at least one other person, said operator having a computer display terminal and computer input device, said method comprising the steps of:

monitoring said communication for the existence of specific input voice phrases and providing a characteristic output when a specific voice phrase is monitored; and responsive to the communications monitoring step, retrieving and presenting to said operator display terminal data relating to said monitored specific voice phrase.

18. The method according to claim 17, wherein said monitoring step includes monitoring information provided by said operator with said computer input device for a specific input phrase, and providing a characteristic output when said specific input phrase is input by said operator.

19. The method according to claim 18, wherein during said monitoring step, upon finding the existence of a specific voice phrase or specific input phrase, assigning a particular context to the communication and limiting the subsequent voice phrases and input phrases, to which the monitoring step is responsive, to a context-related subset.

20. The method according to claim 18, wherein, responsive to said monitoring step finding the existence of one of a specific voice phrase or specific input phrase in said communication, providing related data from said data storage to said operator display.

* * * * *